(12) United States Patent
Owen

(10) Patent No.: US 8,794,216 B2
(45) Date of Patent: Aug. 5, 2014

(54) CHARGE-AIR COOLER

(75) Inventor: Shawn Michael Owen, Ortonville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 138 days.

(21) Appl. No.: 13/616,790

(22) Filed: Sep. 14, 2012

(65) Prior Publication Data

US 2014/0076288 A1    Mar. 20, 2014

(51) Int. Cl.
*F02B 29/04* (2006.01)
*F28F 21/08* (2006.01)
*F28F 13/00* (2006.01)

(52) U.S. Cl.
CPC ........... *F02B 29/045* (2013.01); *F02B 29/0462* (2013.01); *F28F 21/084* (2013.01); *F28F 13/003* (2013.01); *Y10S 165/907* (2013.01)
USPC ........... 123/542; 123/540; 165/155; 165/907; 60/321

(58) Field of Classification Search
CPC ....... F28F 21/084; F28F 1/00; F02B 29/0443; F02B 29/0493; F02B 29/0462; F02B 29/0406; F02B 29/0437; F02B 29/04; F01P 3/12; F02M 35/10268
USPC ........... 123/542; 165/155, 161, 907
See application file for complete search history.

(56) References Cited

U.S. PATENT DOCUMENTS

| | | | |
|---|---|---|---|
| 3,289,756 A * | 12/1966 | Jaeger ........................... | 165/155 |
| 7,191,824 B2 * | 3/2007 | Wu et al. ....................... | 165/141 |
| 2009/0126918 A1 * | 5/2009 | Campagna et al. ........... | 165/164 |
| 2012/0312692 A1 * | 12/2012 | Kimura et al. ................. | 205/50 |

* cited by examiner

*Primary Examiner* — Lindsay Low
*Assistant Examiner* — Kevin Lathers
(74) *Attorney, Agent, or Firm* — Quinn Law Group, PLLC

(57) ABSTRACT

A charge-air cooler includes a reticulated foam element configured to provide a plurality of nonlinear flow paths for a relatively high-temperature first fluid. The charge-air cooler also includes a cooling passage element disposed one of proximate to and in direct contact with the reticulated foam element and configured to accept a relatively low-temperature second fluid. The charge-air cooler additionally includes a header element having a first connection configured to accept inflow of the second fluid to the cooling passage element and a second connection configured to facilitate outflow of the second fluid from the cooling passage element. Furthermore, the charge-air cooler includes a casing configured to house the reticulated foam element, the cooling passage element, and the header element. An internal combustion engine employing such a charge-air cooler is also disclosed.

17 Claims, 3 Drawing Sheets

CHARGE-AIR COOLER

TECHNICAL FIELD

The present disclosure relates to a charge-air cooler and construction thereof.

BACKGROUND

A charge-air cooler is a thermal-management mechanical device used to cool a fluid, including liquids or gases, between stages of a multi-stage heating process. Typically, a charge-air cooler is a heat exchanger that removes waste heat from a gas compressor. Charge-air coolers are used in many applications, including internal combustion engines, air compressors, air conditioners, refrigerators, and gas turbines.

Charge-air coolers are also widely known in the automotive industry as air-to-air or air-to-liquid coolers for internal combustion engines utilizing forced induction, such as via turbocharging or supercharging. In such automotive applications, charge-air coolers are used to improve the engine's volumetric efficiency by increasing density of an intake air charge through nearly isobaric, i.e., constant pressure, cooling.

SUMMARY

One embodiment of the disclosure is directed to a charge-air cooler. The charge-air cooler includes a reticulated foam element configured to provide a plurality of nonlinear flow paths for a relatively high-temperature first fluid. The charge-air cooler also includes a cooling passage element disposed one of proximate to and in direct contact with the reticulated foam element and configured to accept a relatively low-temperature second fluid. The charge-air cooler additionally includes a header element having a first connection configured to accept inflow of the second fluid to the cooling passage element and a second connection configured to facilitate outflow of the second fluid from the cooling passage element. Furthermore, the charge-air cooler includes a casing configured to house the reticulated foam element, the cooling passage element, and the header element.

The reticulated foam element and the cooling passage element may each be defined by a substantially circular outer surface and have a hollow center. In addition, the reticulated foam element and the cooling passage element may be stacked against one another such that the charge-air cooler is characterized by a generally cylindrical outer shape having a hollow central column. In such a case, the first fluid may enter the reticulated foam element from the outer surface, exit the reticulated foam element to the hollow center, and exit the charge-air cooler via the hollow central column.

The reticulated foam element may be constructed from aluminum, while the cooling passage element may be constructed from aluminum tubing.

The reticulated foam element may include a plurality of reticulated foam elements and the cooling passage element may include a plurality of cooling passage elements. In such a case, the plurality of reticulated foam elements and the plurality of cooling passage elements may be disposed in the casing in alternating order.

The casing may include a base element and a cover element. In such a case, the reticulated foam element and the cooling passage element may be disposed between the base and the cover elements.

The charge-air cooler may be configured to reduce the temperature of the first fluid by convection and conduction via the second fluid and supply the reduced temperature first fluid to an internal combustion (IC) engine.

The second fluid may be circulated via a fluid pump, which may be driven mechanically by the IC engine or electrically via a motor.

The first fluid may be air compressed by an air pump and the second fluid may be a coolant used to reduce temperature of the internal combustion engine.

Another embodiment of the disclosure is directed to an internal combustion engine having the charge-air cooler described above.

The above features and advantages, and other features and advantages of the present disclosure, will be readily apparent from the following detailed description of the embodiment(s) and best mode(s) for carrying out the described invention when taken in connection with the accompanying drawings and appended claims.

DETAILED DESCRIPTION

Figure 1:
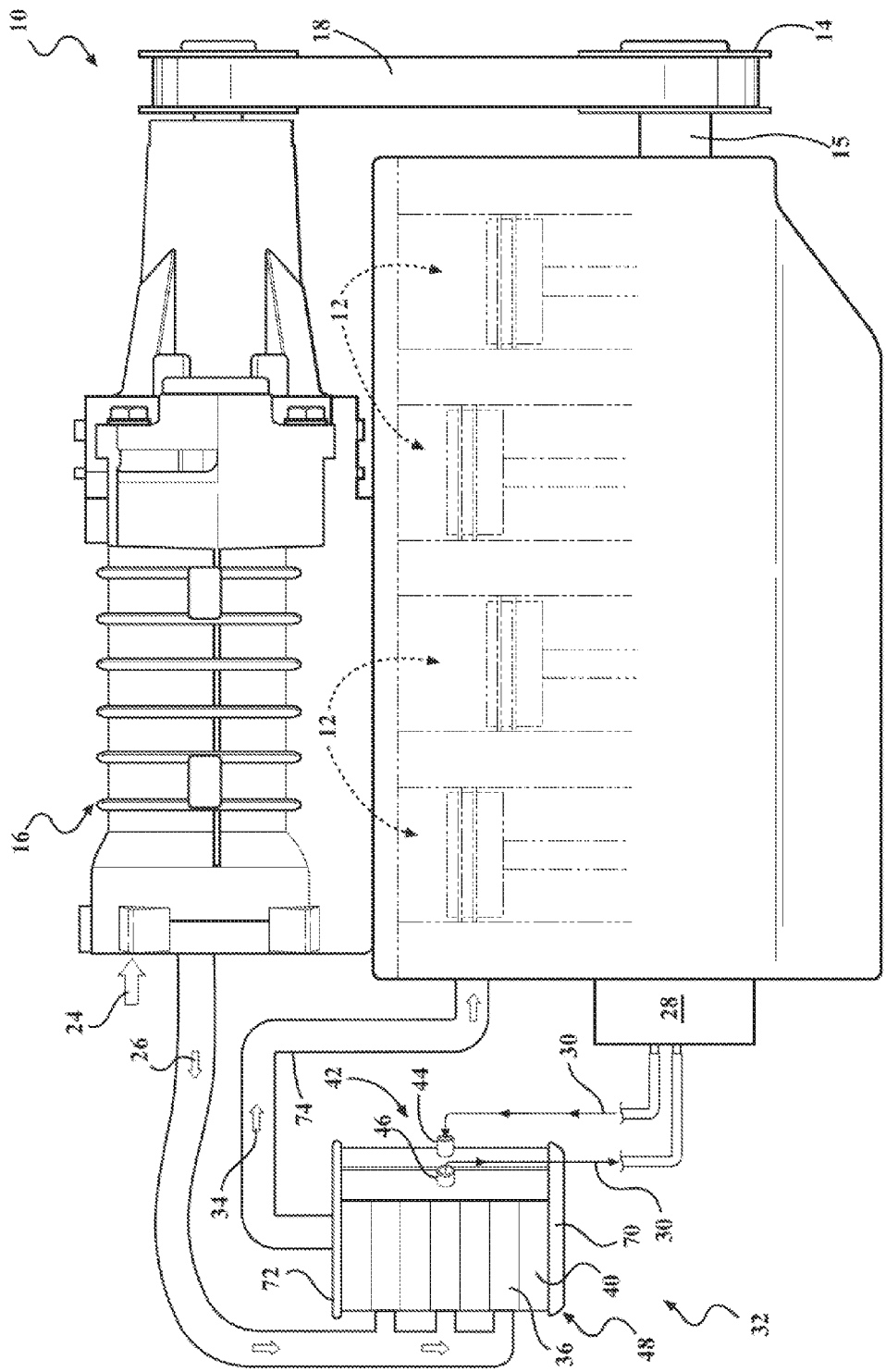
FIG. 1 is a side view of a supercharged internal combustion engine employing a charge-air cooler.

Referring to the drawings wherein like reference numbers correspond to like or similar components throughout the several figures, FIG. 1 illustrates an internal combustion (IC) engine 10 having a plurality of combustion chambers 12, and a crankshaft pulley 14. The crankshaft pulley 14 is driven by a crankshaft 15 of the engine 10. An air pump shown as a supercharger 16 is attached to the engine 10. Although the supercharger 16 is shown as being driven directly by the engine 10 via a drive belt 18, an electrically driven supercharger is similarly envisioned. The supercharger 16 is adapted for use with the IC engine 10, and is operable to increase the volumetric efficiency thereof, as understood by those skilled in the art. Although a supercharger 16 is shown, an exhaust gas driven turbocharger type of an air pump while not shown is similarly envisioned.

The supercharger 16 is configured to receive ambient inlet air 24, generate a flow of first fluid or compressed outlet air 26, and subsequently deliver the compressed air to the combustion chambers 12. Following its exit from the supercharger 16, the compressed outlet air 26 is characterized by relatively high-temperature due to both high compression of the air medium and coming into contact with various internal components (not shown) of the supercharger. Such supercharger components themselves experience elevated temperatures due to being in contact with the engine 10 and also the work generated by the supercharger while displacing and/or compressing the inlet air 24. The engine 10 may also include a fluid pump 28. The fluid pump 28 may either be driven mechanically by the engine 10 or electrically by an external source such as an electric motor (not shown). The fluid pump 28 is configured to circulate a second fluid or a liquid coolant 30 characterized by relatively low-temperature through the engine 10 for reducing operating temperature of the engine. Although not shown, the coolant 30 may also be circulated through its own closed loop low temperature cooling system having a dedicated low temperature radiator.

As shown, the supercharger 16 is fluidly connected to a charge-air cooler 32. The charge-air cooler 32 is configured to receive the compressed relatively high-temperature outlet air 26 from the supercharger 16. Additionally, the charge-air cooler 32 reduces the temperature of the compressed outlet air 26 by convection via the coolant 30, thereby transforming the relatively high-temperature outlet air 26 into a reduced temperature and increased density compressed outlet air 34. Accordingly, as described herein, the charge-air cooler 32 operates as an air-to-liquid heat exchanger to further increase the operating efficiency of the engine 10 by supplying the reduced temperature and increased density compressed outlet air 34 to the combustion chambers 12.

Figure 2:
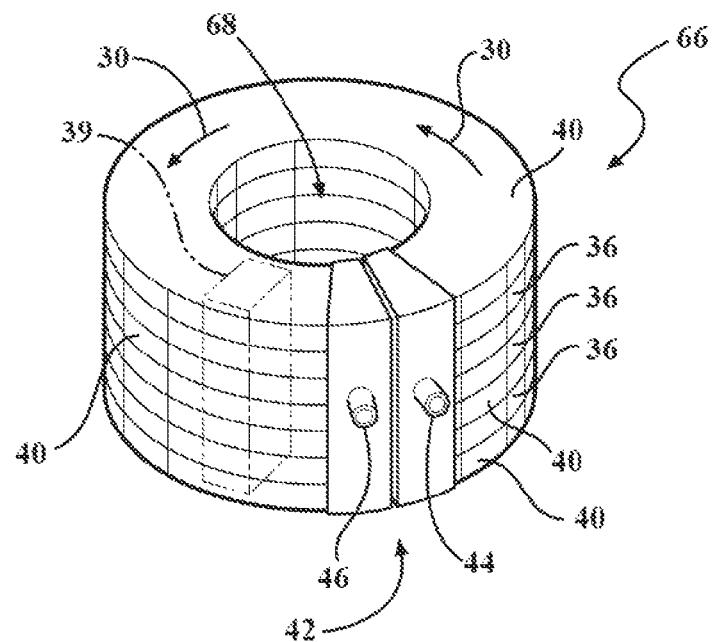
FIG. 2 is a perspective top view of the charge-air cooler depicted in FIG. 1.
Figure 4:
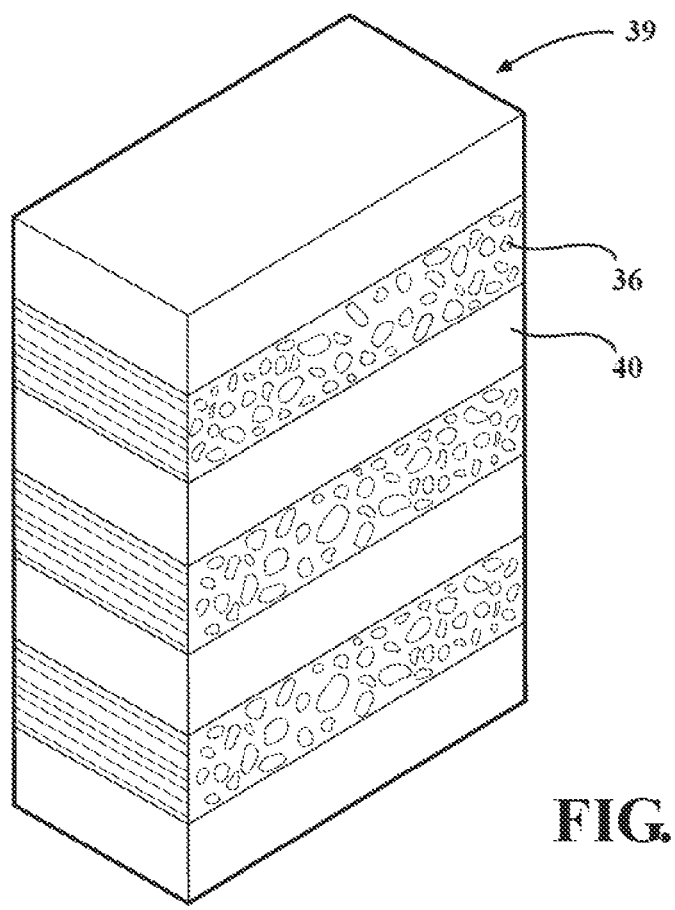
FIG. 4 is a close-up perspective view of a cross-section of the charge-air cooler depicted in FIGS. 1-3.

As shown in FIG. 2, the charge-air cooler 32 includes a plurality of substantially identical reticulated foam elements 36 configured to provide a plurality of nonlinear flow paths 38 for the compressed outlet air 26. Each reticulated foam element 36 has a solid open-cell foam structure, as shown in the cross-section 39 depicted in FIG. 4. The solid open-cell foam structure of the reticulated foam element 36 may be constructed from a lightweight metal, such as aluminum, or from a ceramic material. Typically, reticulated foam is a very porous, low density, and open, but solid structure, which may be traversed by a fluid. Porosity of reticulated foam is typically 95%, but may be as high as 98%. Accordingly, while there is some resistance to fluid flow through the reticulated foam structure, thus generating the nonlinear flow paths, there is no outright blockage of the flow.

Although three reticulated foam elements 36 are depicted in FIG. 1-4, any number of such reticulated foam elements may be employed in the charge-air cooler 32 depending on the volume of compressed outlet air 26 that needs to be passed through the charge-air cooler within a specific amount of time per predetermined heat rejection performance requirements. The charge-air cooler 32 also includes a plurality of cooling passage elements 40. Each cooling passage element 40 is disposed proximate to or in direct contact with the reticulated foam element 36 and configured to accept the coolant 30 from the fluid pump 28. Although four cooling passage elements 40 are depicted, any number of such cooling passage elements may be employed in the charge-air cooler 32 depending on the cooling rate sought for the compressed outlet air 26 that is passed through the charge-air cooler. A permanently combined charge-air cooler 32 unit may be formed by brazing the appropriate number of cooling passage elements 40 together with the respective reticulated foam elements 36.

The cooling passage element 40 may be constructed from tubing, formed from metal characterized by high thermal conductivity, such as aluminum. As shown, the cooling passage elements 40 are fluidly connected to the pump 28 via a header element 42. The header element 42 includes a first connection 44 configured to accept inflow of the coolant 30 to the cooling passage element 40 and a second connection 46 configured to facilitate outflow of the coolant from the cooling passage element to the engine 10 or the cooling system. Furthermore, the charge-air cooler 32 includes a casing 48 configured to house the reticulated foam element 36, the cooling passage element 40, and the header element 42. As may be seen in FIG. 2, the reticulated foam elements 36 and the cooling passage elements 40 are disposed in the casing 48 in alternating order.

Figure 3:
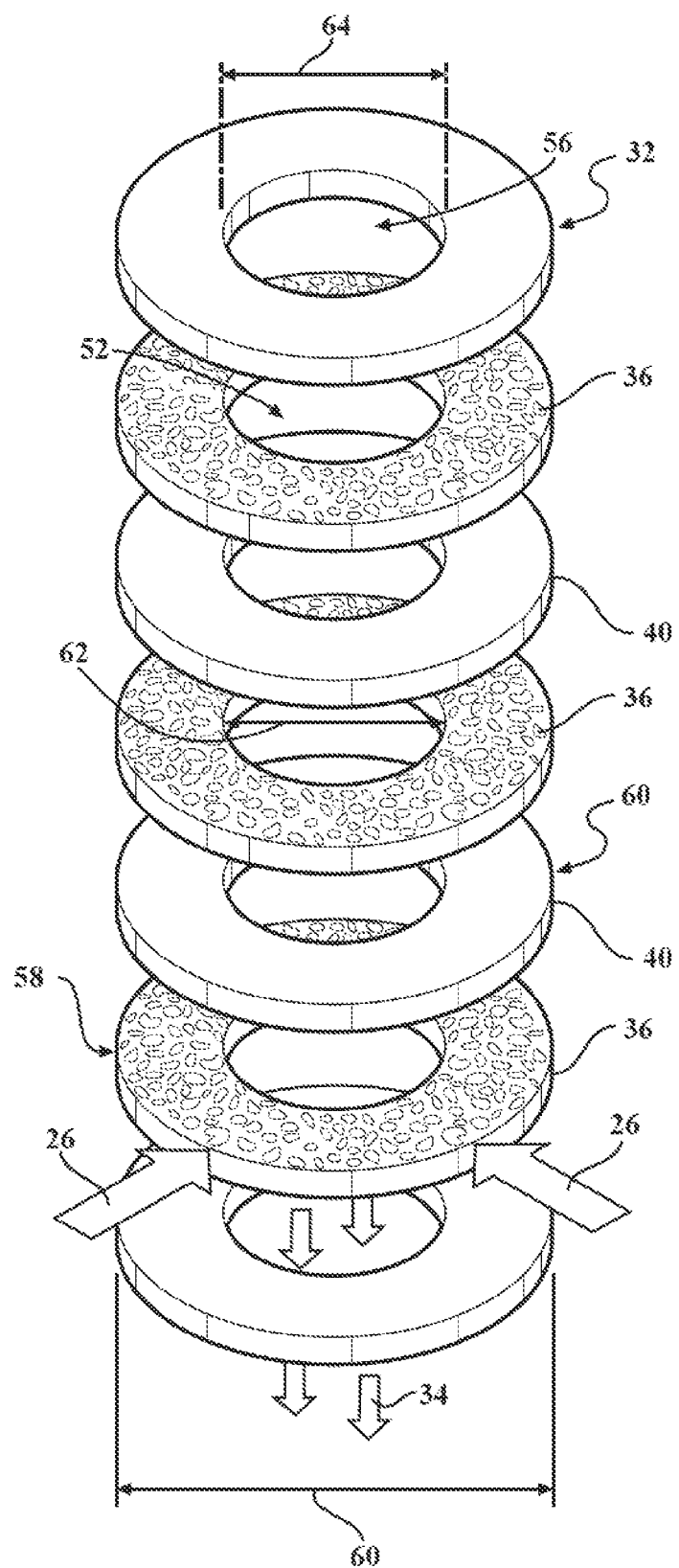
FIG. 3 is an exploded perspective top view of the charge-air cooler depicted in FIG. 2.

As shown in FIGS. 2 and 3, each reticulated foam element 36 is defined by a substantially circular shape having a hollow center 52. Similar to the reticulated foam element 36, each cooling passage element 40 is also defined by a substantially circular shape that includes a hollow center 56. The element 36 and the cooling passage element 40 have substantially equivalent respective outer diameters 58 and 60, and substantially equivalent respective inner diameters 62 and 64. Thus, when the reticulated foam element 36 and the cooling passage element 40 are stacked against one another, the charge-air cooler 32 is characterized by a generally cylindrical outer shape 66 having a hollow central column 68 (as shown in FIG. 2). As may be seen in FIG. 1, the casing 48 includes a base element 70 and a cover element 72. The reticulated foam elements 36 and the cooling passage elements 40 are disposed between and retained by the base and the cover elements 70 and 72, respectively.

Referring back to FIG. 2, the cylindrical outer shape 66 of the charge-air cooler 32 may provide advantages over a rectangular shape, because of greater surface area available for cooling of the compressed outlet air 26. Additionally, the exiting flow path of the reduced temperature and increased density compressed outlet air 34 may be more focused with respect to an air duct 74 (shown in FIG. 1) and a throttle body (not shown) of the engine 10. Furthermore, the cylindrical outer shape 66 of the charge-air cooler 32 may provide packaging benefits under the hood of a vehicle housing the engine 10 versus a typical rectangular charge-air cooler. Although the outer shape 66 and the hollow central column 68 of the charge-air cooler 32 are herein specifically described as having a circular shape, in the alternative each of the respective features may have an elongated or oval shape.

During operation, the compressed outlet air 26 enters each reticulated foam element 36 from the outer surface 50. The flow of the compressed outlet air 26 is slowed down inside the reticulated foam element 36 by the reticulated foam element's open-cell foam structure which acts as a tortuous, labyrinth path for the flow of air, and is then permitted to exit the reticulated foam element 36 to the hollow center 52. While inside the reticulated foam element 36, the compressed outlet air 26 is cooled by convection via the coolant 30, and then the air exits the charge-air cooler 32 via the hollow central column 68 as the reduced temperature and increased density compressed outlet air 34. From the charge-air cooler 32, the reduced temperature and increased density compressed outlet air 34 is channeled to the engine 10 via the suitably configured air duct 74.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:
1. A charge-air cooler comprising:
   a reticulated foam element configured to provide a plurality of nonlinear flow paths for a relatively high-temperature first fluid;
   a cooling passage element disposed one of proximate to and in direct contact with the reticulated foam element and configured to accept a relatively low-temperature second fluid;
   a header element having a first connection configured to accept inflow of the second fluid to the cooling passage element and a second connection configured to facilitate outflow of the second fluid from the cooling passage element;
   a casing configured to house the reticulated foam element, the cooling passage element, and the header element; and wherein each of the reticulated foam element and the cooling passage element is defined by a substantially circular outer surface and a hollow center;

the charge-air cooler is characterized by a generally cylindrical outer shape having a hollow central column in a longitudinal direction of the charge-air cooler, and the reticulated foam element and the cooling passage element are stacked against one another in the longitudinal direction; and the first fluid enters the reticulated foam element from the circular outer surface and exits the reticulated foam element to the hollow center, and exits the charge-air cooler via the hollow central column.

2. The charge-air cooler of claim 1, wherein the reticulated foam element is constructed from aluminum.

3. The charge-air cooler of claim 1, wherein the cooling passage element is constructed from aluminum tubing.

4. The charge-air cooler of claim 1, wherein the reticulated foam element includes a plurality of reticulated foam elements, the cooling passage element includes a plurality of cooling passage elements, and the plurality of reticulated foam elements and the plurality of cooling passage elements are disposed in the casing in alternating order.

5. The charge-air cooler of claim 1, wherein the casing includes a base element and a cover element, and wherein the reticulated foam element and the cooling passage element are disposed between the base and the cover elements.

6. The charge-air cooler of claim 1, wherein the charge-air cooler is used in a vehicle having an internal combustion (IC) engine, and wherein the charge-air cooler is configured to reduce the temperature of the first fluid by convection via the second fluid and supply the reduced temperature first fluid to the IC engine.

7. The charge-air cooler of claim 6, wherein the vehicle includes a fluid pump, and wherein the second fluid is circulated via the fluid pump.

8. The charge-air cooler of claim 7, wherein the first fluid is air compressed by an air pump and the second fluid is a coolant used to reduce temperature of the IC engine.

9. The charge-air cooler of claim 8, wherein the fluid pump is driven one of mechanically by the IC engine and electrically.

10. An internal combustion engine comprising:
a combustion chamber;
an air pump configured to generate a flow of compressed air characterized by relatively high-temperature;
a fluid pump configured to circulate a coolant characterized by relatively low-temperature through the engine for reducing temperature of the engine; and
a charge-air cooler configured to receive the compressed relatively high-temperature air from the air pump, reduce the temperature of the compressed air by convection via the coolant, and supply the reduced temperature compressed air to the combustion chamber, the charge-air cooler including:
a reticulated foam element configured to provide a plurality of nonlinear flow paths for the compressed air;
a cooling passage element disposed one of proximate to and in direct contact with the reticulated foam element and configured to accept the coolant from the fluid pump;
a header element having a first connection configured to accept inflow of the coolant to the cooling passage element and a second connection configured to facilitate outflow of the coolant from the cooling passage element to the engine;
a casing configured to house the reticulated foam element, the cooling passage element, and the header element; and wherein each of the reticulated foam element and the cooling passage element is defined by a substantially circular outer surface and a hollow center;

the charge-air cooler is characterized by a generally cylindrical outer shape having a hollow central column in a longitudinal direction of the charge-air cooler, and the reticulated foam element and the cooling passage element are stacked against one another in the longitudinal direction; and the first fluid enters the reticulated foam element from the circular outer surface and exits the reticulated foam element to the hollow center, and exits the charge-air cooler via the hollow central column.

11. The engine of claim 10, wherein the reticulated foam element is constructed from aluminum.

12. The engine of claim 10, wherein the cooling passage element is constructed from aluminum tubing.

13. The engine of claim 10, wherein the reticulated foam element includes a plurality of reticulated foam elements, the cooling passage element includes a plurality of cooling passage elements, and the plurality of reticulated foam elements and the plurality of cooling passage elements are disposed in the casing in alternating order.

14. The engine of claim 10, wherein the casing includes a base element and a cover element, and wherein the reticulated foam element and the cooling passage element are disposed between the base and the cover elements.

15. The engine of claim 10, wherein the fluid pump is driven one of mechanically by the IC engine and electrically.

16. A charge-air cooler comprising:
a reticulated foam element configured to provide a plurality of nonlinear flow paths for a relatively high-temperature first fluid;
a cooling passage element disposed one of proximate to and in direct contact with the reticulated foam element and configured to accept a relatively low-temperature second fluid;
a header element having a first connection configured to accept inflow of the second fluid to the cooling passage element and a second connection configured to facilitate outflow of the second fluid from the cooling passage element; and
a casing configured to house the reticulated foam element, the cooling passage element, and the header element;
wherein:
each of the reticulated foam element and the cooling passage element is defined by a substantially circular outer surface and a hollow center;
the charge-air cooler is characterized by a generally cylindrical outer shape having a hollow central column in a longitudinal direction of the charge-air cooler, and the reticulated foam element and the cooling passage element are stacked against one another in the longitudinal direction;
the first fluid enters the reticulated foam element from the circular outer surface and exits the reticulated foam element to the hollow center, and exits the charge-air cooler via the hollow central column; and
wherein the reticulated foam element is constructed from aluminum and the cooling passage element is constructed from aluminum tubing.

17. The charge-air cooler of claim 16, wherein the reticulated foam element includes a plurality of reticulated foam elements and the cooling passage element includes a plurality of cooling passage elements, and the plurality of reticulated foam elements and the plurality of cooling passage elements are disposed in the casing in alternating order.

\* \* \* \* \*